(12) United States Patent
Ostrovsky et al.

(10) Patent No.: US 8,060,808 B2
(45) Date of Patent: Nov. 15, 2011

(54) METHOD FOR LOW DISTORTION EMBEDDING OF EDIT DISTANCE TO HAMMING DISTANCE

(75) Inventors: Rafail Ostrovsky, Los Angeles, CA (US); Yuval Rabani, Haifa (IL)

(73) Assignees: The Regents of the University of California, Oakland, CA (US); The TRDF Research & Development Foundation Ltd (IL)

( * ) Notice: Subject to any disclaimer, the term of this patent is extended or adjusted under 35 U.S.C. 154(b) by 1058 days.

(21) Appl. No.: 11/816,890

(22) PCT Filed: Feb. 28, 2006

(86) PCT No.: PCT/US2006/007183
§ 371 (c)(1),
(2), (4) Date: Aug. 22, 2007

(87) PCT Pub. No.: WO2006/094016
PCT Pub. Date: Sep. 8, 2006

(65) Prior Publication Data
US 2008/0114722 A1    May 15, 2008

Related U.S. Application Data

(60) Provisional application No. 60/657,129, filed on Feb. 28, 2005.

(51) Int. Cl.
*H03M 13/00*    (2006.01)

(52) U.S. Cl. .................. 714/777; 714/755; 714/786

(58) Field of Classification Search .................. 714/755, 714/777, 786
See application file for complete search history.

(56) References Cited

U.S. PATENT DOCUMENTS

| | | | |
|---|---|---|---|
| 4,490,811 A * | 12/1984 | Yianilos et al. | 1/1 |
| 4,888,779 A * | 12/1989 | Karabed et al. | 714/792 |
| 5,289,391 A * | 2/1994 | Ibrahim et al. | 702/74 |
| 5,432,803 A | 7/1995 | Liu et al. | |
| 5,865,637 A * | 2/1999 | Shinozaki et al. | 439/287 |
| 6,084,535 A * | 7/2000 | Karabed et al. | 341/58 |
| 6,119,124 A * | 9/2000 | Broder et al. | 1/1 |
| 6,226,640 B1 | 5/2001 | Ostrovsky et al. | |
| 6,452,985 B1 | 9/2002 | Hatakeyama et al. | |
| 7,321,995 B2 * | 1/2008 | Kikuchi et al. | 714/701 |
| 2006/0212860 A1 * | 9/2006 | Benedikt et al. | 717/144 |

OTHER PUBLICATIONS (Qin Lv, Kai Li and Mosses charikar) Image Similarity Search with Compact Data Structures, Nov. 8, 2004, Department of Computer Science princeton University, pp. 1-10.*
PCT International Search Report for PCT/US06/07183, Applicant: The Regents of the University of California, Forms PCT/ISA/210 and 220, dated Dec. 31, 2007 (5 pages).
PCT Written Opinion of the International Search Authority for PCT/US06/07183, Applicant: The Regents of the University of California, Form PCT/ISA/237, dated Dec. 31, 2007 (5 pages).

(Continued)

*Primary Examiner* — Esaw Abraham
(74) *Attorney, Agent, or Firm* — Vista IP Law Group LLP

(57) ABSTRACT

A method of embedding the edit distance metric into the Hamming distance metric with low distortion. In other words, two input character strings are mapped to two corresponding output bit strings such that the Hamming distance between the output strings is approximately proportional to the edit distance between the two corresponding input strings.

6 Claims, 1 Drawing Sheet

OTHER PUBLICATIONS

Corrected PCT International Search Report for PCT/US06/07183, Applicant: The Regents of the University of California, Forms PCT/ISA/224 and 210, dated Mar. 24, 2009 (4 pages).

Corrected PCT Written Opinion of the International Search Authority for PCT/US06/07183, Applicant: The Regents of the University of California, Forms PCT/ISA/224 and 237, dated Mar. 24, 2009 (4 pages).

PCT International Preliminary Report on Patentability (Chapter I of the Patent Cooperation Treaty) for PCT/US2006/007183, Applicant: The Regents of the University of California, Form PCT/IB/326 and 373, dated Apr. 9, 2009 (5 pages).

Ostrovsky, R., et al., "Low Distortion Embedding for Edit Distance", Preliminary. The proceedings version appeared at STOC 2005, Computer Science Department, University of California at Los Angeles, 90095, USA and Computer Science Department, Technion—Israel Institute of Technology, Haifa, 32000, Israel, Aug. 2005 (16 pages).

Andoni, A., et al., "Lower Bounds for Embeddings of Edit Distance into Normed Spaces", Jan. 2003 (4 pages).

* cited by examiner

US 8,060,808 B2

METHOD FOR LOW DISTORTION EMBEDDING OF EDIT DISTANCE TO HAMMING DISTANCE

REFERENCE TO RELATED APPLICATIONS

This Application is a U.S. National Stage filing under 35 U.S.C. §371 of International Application No. PCT/US2006/007183, filed Feb. 28, 2006, which claims priority of U.S. Provisional Patent Application No. 60/657,129, filed Feb. 28, 2005. The contents of the aforementioned applications are incorporated by reference as if set forth fully herein. Priority to the aforementioned application is hereby expressly claimed in accordance with 35 U.S.C. §§119, 120, 365 and 371 and any other applicable statutes.

STATEMENT REGARDING FEDERALLY SPONSORED RESEARCH AND DEVELOPMENT

This invention was made with Government support under Grant No. US-00282-02 awarded by the Binational Agriculture Research & Development Fund and Grant No. 0430254 awarded by the National Science Foundation. The Government has certain rights in this invention.

FIELD OF THE INVENTION

The present invention relates generally to a method of embedding a first metric (e.g., edit distance) into a second metric (e.g., Hamming distance) with low distortion, so techniques available in the second metric may be performed on the embedded data to produce similar results as if the techniques were available in the first metric and were performed on the data in the first metric.

BACKGROUND OF THE INVENTION

An edit distance between two character strings is the number of single-character insert and delete keyboard operations required to change a first string into the second string. We denote the edit distance between string x and string y as ed(x, y). A Hamming distance between two bit strings of the same length is the number of bits in the first string that must be switched to result in the second string, or in other words, the number of bit positions in which the two strings differ. We denote the Hamming distance between string x' and string y' as H(x', y'). For ease of expression we refer to input strings in general as character strings, and output strings as bit strings, since we are discussing mapping character strings (in the edit distance metric) to bit strings (in the Hamming distance metric). However, details of the method described herein may refer to input strings as bit strings as well.

There are many useful applications involving strings for which very efficient solutions are known in the Hamming distance metric, including sketching and nearest neighbor search. See, e.g., U.S. Pat. No. 6,226,640 (the '640 patent) issued May 1, 2001, to Ostrovsky and Rabani, titled "Method for determining approximate hamming distance and approximate nearest neighbors of a query," the contents of which is incorporated by reference as if set forth fully herein. For character strings in the edit distance metric, such solutions are scarce but needed. For example, edit distance plays a central role in text processing and many web applications. Furthermore, fast estimation of edit distance and efficient search according to the edit distance are widely investigated and used in computational biology. Thus, it would be desirable to provide a method to map input character strings to output bit strings such that the Hamming distance between two output bit strings is approximately proportional to the edit distance between their corresponding input character strings. Such a mapping would allow known procedures in the Hamming distance metric to be performed on the output strings and yield similar (within an accepted tolerance) results as if the procedures were available in the edit distance metric and were performed on the input character strings in the edit distance metric.

Previously, such a mapping was not known, as stated in the following publication, the contents of which is incorporated by reference as if set forth fully herein: "Lower bounds for embedding edit distance into normed spaces." A. Andoni, M. Deza, A. Gupta, P. Indyk, and S. Raskhodnikova. *Proc. of the 14$^{th}$ Ann. ACM-SIAM Symp. on Discrete Algorithms*, Baltimore, Md., January 2003, pages 523-526.

SUMMARY OF THE INVENTION

The present invention provides a method of embedding a first metric (e.g., edit distance) into a second metric (e.g., Hamming distance) with low distortion, so techniques available in the second metric may be performed on the embedded data to produce similar results as if the techniques were available in the first metric and were performed on the data in the first metric. In other words, two input character strings are translated/mapped into two corresponding output bit strings such that the Hamming distance between the two output strings is approximately proportional to the edit distance between the two input strings. By "approximately proportional" we mean the Hamming distance between the two output strings does not exceed the edit distance between the two input strings multiplied by a distortion factor, and also the Hamming distance between the two output strings is no less than the edit distance between the two input strings divided by the distortion factor. The method of the invention provably embeds an edit distance metric into a Hamming distance metric with a low distortion factor, i.e., a distortion factor of at most $2^{O(\sqrt{\log d \log \log d})}$, where d is the character length of the input string. This distortion factor is a small and acceptable constant for practical purposes. The proofs are set forth in the '129 Provisional Application, and/or are otherwise known or capable of determination by those of ordinary skill in the art.

Although the mapping method takes a single input and produces a single output, a property of the invention is revealed by examining the relationship between two different outputs (x' and y') on the one hand, and the relationship between their corresponding inputs (x and y) on the other hand. Specifically, the Hamming distance between x' and y' gives, within an acceptable distortion factor, an estimate on the edit distance between x and y. Because many useful and efficient applications are known involving bit strings in the Hamming distance metric (and others are relatively simple to develop compared to applications in the edit distance metric), mapping strings according to our invention allows faster and more precise analysis, search, and indexing of data according to edit distance, by allowing use of applications in the Hamming distance metric.

Therefore, one embodiment of the invention includes mapping a first input string into a first output string, and mapping a second input string into a second output string, wherein the Hamming distance between the output strings approximates an edit distance between the input strings within a low distortion factor.

A specific embodiment of the invention includes mapping a d-bit input string to an output string by: step a) setting the output string to the input string if d is below a threshold, otherwise performing steps b) through h); step b) partitioning the input string into several contiguous blocks of length L; step c) performing steps d) through g) on each block for each whole number j from zero to n where n is the largest number such that $(\log d)^{n+1}$ is less than or equal to L, creating a z-string for each such performance of steps d) through g); step d) defining a plurality of shifted substrings by taking a sliding window of the block having length $L-(\log d)^j$ for each whole number from zero to $(\log d)^j$; step e) recursively mapping each shifted substring to a corresponding mapped substring, the recursive mapping comprising performing steps a) through h) using the shifted substring being mapped as the input string; step f) picking k independent uniformly randomly distributed samples of b bit positions of each of the mapped substrings, picking the same b bit positions from each mapped substring within each sample, where k is chosen to reflect a probability of success, and b is dependent on d and j; step g) constructing the z-string by concatenating a mini z-string for each of the k samples, each mini z-string created by: 1) initially setting each position in the mini z-string to a value of 0; 2) constructing a corresponding sampled substring for each of the mapped substrings by concatenating the bits from the b picked bit positions of the corresponding mapped substring; 3) performing a hash function on each of the sampled substrings, each time calculating a position within the mini z-string and then incrementing the value at the calculated position by 1; and step h) scaling each of the z-strings constructed, and then concatenating the scaled z-strings and converting the resulting concatenated z-string to a bit string using unary notation to form the output string.

DETAILED DESCRIPTION OF THE PREFERRED EMBODIMENTS

Figure 1:
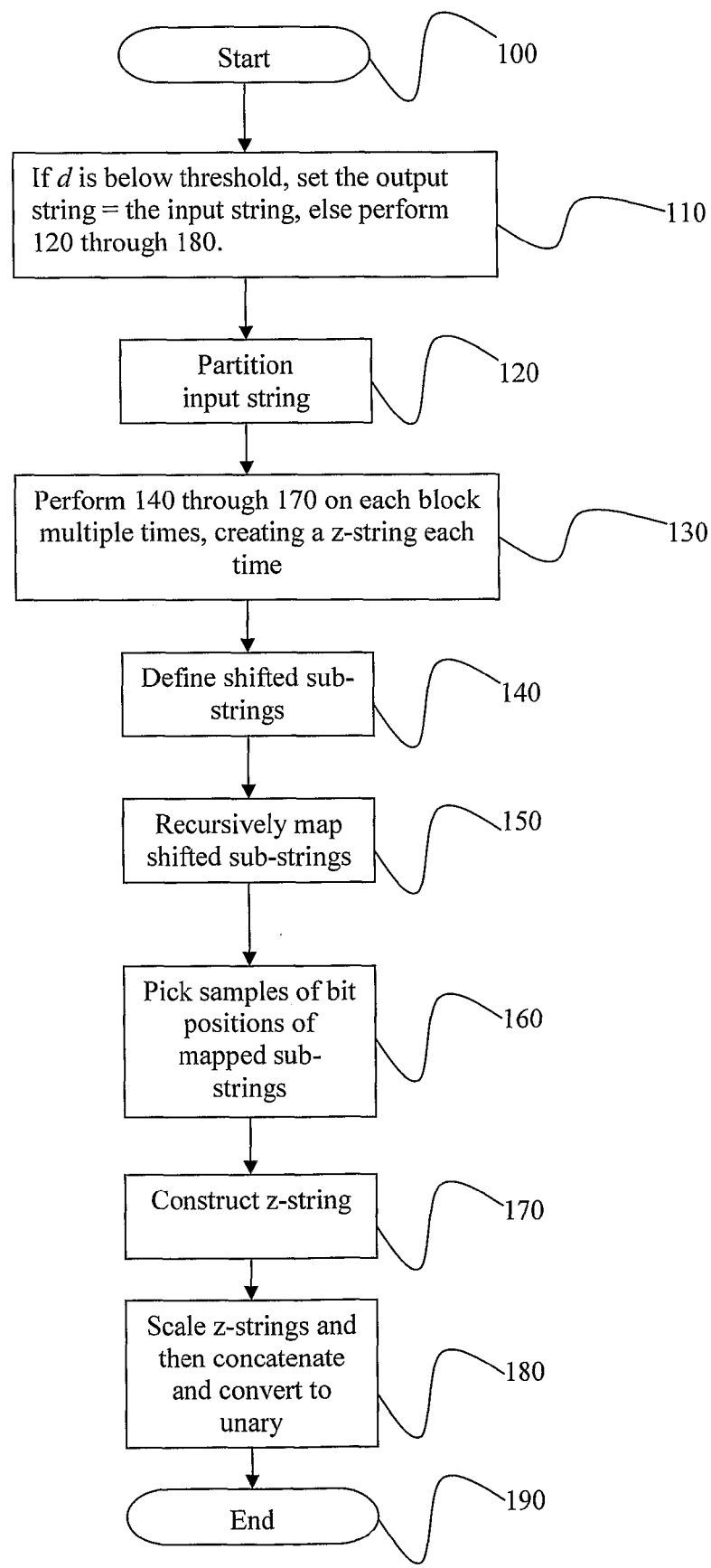
FIG. 1 is a flowchart showing a method of the present invention.

The invention will now be described in detail, in association with the accompanying drawing. Turning to FIG. 1, a flowchart illustrates a method of the present invention mapping a single d-bit input string to an output string. Although the method involves recursion, the flowchart in FIG. 1 is a straight-line flowchart for ease of expression. The method begins at step 100. Since the method involves recursion dependent on d, the first step 110 involves checking for the trivial case in which d is below the threshold. If so, then the output string is set to the input string. Otherwise, steps 120 through 180 are performed. The threshold is a sufficiently large constant. However, as the threshold increases, the distortion factor increases such that the guarantee of approximation degrades. For example, a threshold of 256 is sufficient.

Presuming we do not have the trivial case, the process continues to step 120, where the input string is partitioned into several contiguous blocks of length L. Preferably, L is calculated as $L=d/(2^{\sqrt{(\log d \log \log d)}})$. If the input string is not exactly divisible by L, then the string is partitioned into blocks having size L or L+1, using as many blocks of size L+1 as needed to ensure the entire string is partitioned.

Once the string is partitioned, the process continues to step 130, which comprises performing steps 140 through 170 on each block of the string multiple times, creating a z-string each time. A z-string is simply a temporary string which we have referred to as z in the '129 Provisional Application. In a preferred embodiment, the number of times steps 140 through 170 are performed on each block is dependent on d. Specifically, they are performed for each whole number j from zero to n where n is the largest number such that $(\log d)^{n+1}$ is less than or equal to L.

At step 140, a set of shifted substrings is defined/created from the input string. For example, the first shifted substring might include bits 1 through 25 of a 30-bit input string. The second shifted substring would include bits 2 through 26. The 6th shifted substring would include bits 6 through 30. In the preferred embodiment, recall step 140 is performed for each value of j for each block. Thus, we refer to this process as taking a sliding window of the input string. The length of a sliding window (and thus of a shifted substring) for one value of j during operation on a given block is the number of bits in a shifted substring for that value of j during operation on that block. In a preferred embodiment, the length of such a sliding window is calculated as $L-(\log d)^j$. Note that for each such operation there are therefore $(\log d)^j+1$ shifted substrings, and the length of a shifted substring is much less than the length d of the input string.

Now that the shifted substrings have been defined, at step 150 we map each one to a corresponding mapped substring, resulting in a set of mapped substrings. Again in the preferred embodiment, recall step 150 is performed for each value of j for each block. The mapping for each shifted substring is recursive, in that steps 110 though 180 are performed for each shifted substring being mapped, using the shifted substring as the original input string. Thus, more details of the mapping will be described in connection with steps 160 through 180.

At step 160 k independent uniformly randomly distributed samples of b bit positions of each of the mapped substrings are picked, picking the same b bit positions from each mapped substring within each sample. Again in the preferred embodiment, recall step 160 is performed for each value of j for each block. The value of k is chosen to reflect a probability of success, and b is dependent on d and j. For example, depending on the application, we may accept varying probabilities of success, and set k accordingly. Specifically, if there are many input strings, such as would be the case in a nearest neighbor search application, k should be relatively large. On the other hand, for a sketching application with only a small quantity of input strings, k may be very small. In a preferred embodiment, k is a constant that is $20*(\log d)^j*\log (\log d)^j/F$, where F is the acceptable probability of failure. A constant factor may be used to vary the value of k for different applications. The value of b in a preferred embodiment is $(d*\log(4(\log d)^j))/(\log d)^j$.

Still referring to step 160, as a simple illustrative (but not practical) example, presume for one of the k samples that b is 9, and the length of a mapped substring is 100 bits. Then presume that the 9 bit positions selected uniformly and randomly are positions 1, 5, 7, 22, 27, 35, 44, 56, and 85. These same 9 bit positions will be used from each mapped substring within this sample. We will use this illustrative example for a particular one of the k samples in connection with the description of step 170. Note that although the selected positions may be repetitive (e.g., 1, 5, 7, 7, 22, . . . shows bit 7 selected twice), our example here uses no repetitions.

Recall step 170, in the preferred embodiment, is performed for each value of j for each block. However, the following description applies to just a single execution of step 170, i.e., for a single block with a single value of j. At step 170, a z-string is created by first creating a mini z-string for each of the k samples, and then concatenating the mini z-strings to form the z-string. The length of a mini z-string in a preferred embodiment is $4*(\log d)^j$, and thus the length of a z-string is $k*4*(\log d)^j$.

A mini z-string for a sample is created by initially setting each position (not a bit, but a position) in the mini z-string to a value of zero. Then, a corresponding sampled substring is constructed for each of the mapped substrings by concatenating the bits from the b picked bit positions of each corresponding mapped substring. Then, a hash function is performed on each of the sampled substrings, each time calculating a position within the mini z-string for which the values at that position is incremented by 1. The hash function may be any efficient hash function mapping a universe of size $2^b$ into a set of size t, where t is the length of a z-string (see step 130).

For example, continuing with the illustrative (but not practical) example above, presume that a mini z-string has 10 positions. Each is, accordingly, initialized to zero. Further, presume that the values of one mapped substring at bits 1, 5, 7, 22, 27, 35, 44, 56, and 85 are 1,0,1,0,1,0,1,0 respectively. Then the sampled substring for that mapped substring would be 10101010. A hash function is applied to the string 10101010, to calculate a position within the mini z-string. Presume the hash function calculated the number 6. Then position 6 in the mini z-string would be incremented by 1.

The above process (concatenation, hashing, and incrementing) occurs for each of the mapped substrings within a sample, resulting in a mini z-string each time. For each sample, this results in a number of mini z-strings equal to the number of samples. This plurality of mini z-strings is then concatenated to produce the z-string for a particular block and a particular value of j. The order of concatenation is not important, so long as the construction of each z-string for each value of j for each block is the same order.

At step 180, the final mapping of the input string to the output string is constructed by scaling all of the z-strings from all of the values of j from all of the blocks, and then concatenating the scaled z-strings and converting the resulting concatenated z-string to a bit string using unary notation to form the output string. In a preferred embodiment, the scaling refers to dividing each position in the z-string by the number of positions in the z-string.

The above method as described in connection with FIG. 1 may be performed on multiple input strings. Using the above method on a first input string and a second input string, the Hamming distance between the first output string and the second output string will approximate the edit distance between the first input string and the second input string within a low distortion factor. In one embodiment, the Hamming distance does not exceed the edit distance multiplied by the distortion factor, and the Hamming distance is no less than the edit distance divided by the distortion factor. To determine edit distances between strings of differing lengths, the shorter string may be padded, or the longer truncated, prior to performing the method of the present invention.

The output strings may be shorter than their respective input strings, or they may be longer. In either case, sketches may be created of the output strings, such that the Hamming distance between the sketches approximates the Hamming distance between the output strings themselves within the distortion factor, and thus the Hamming distance between the sketches also approximates the edit distance between the input strings within the distortion factor.

Thus, a method has been described for embedding the edit distance metric into the Hamming distance metric. A first input string is mapped into a first output string. A second input string into mapped into a second output string. And the Hamming distance between the output strings approximates the edit distance between the input strings within a low distortion factor. The method includes use of a sliding window procedure as previously described, which comprises partitioning an input string into several contiguous blocks of length L, defining a plurality of shifted substrings of the input string by taking a sliding window of one of the blocks, the sliding window having length L−(log d)$^j$ for each whole number from zero to (log d)$^j$, where j is the largest number such that (log d)$^{j+1}$ is less than or equal to L. The method of the present invention has many practical uses in text processing, many web applications, and computational biology. Sketching and nearest neighbor searching are two applications which will be briefly discussed.

Sketching is simply a method of taking a character string and producing a small-size "fingerprint" or "sketch" of it such that given two character strings x and y, ed(x, y) can be estimated by computing an efficient function on their corresponding sketches. Again, there known sketching algorithms in the Hamming distance metric. Thus, the method of the present invention may be applied to map character strings x and y to bit strings x' and y' respectively, and then a known (or later-developed) sketching algorithm in the Hamming distance metric may be performed on the output strings. In this manner, the Hamming distance between the sketches will approximate the Hamming distance between x' and y' within the distortion factor, such that the Hamming distance between the sketches also approximates the edit distance between the original character input strings x and y within the distortion factor.

An example of the value of sketching is as follows. Assume two web pages x and y (or any two massive documents) are being compared. The ed(x, y) can be calculated using brute force. But using the method of the present invention, output strings/documents x' and y' may be sketched into two corresponding documents that are much smaller, and the comparison function may be made on the smaller documents using Hamming algorithms. The result of the comparison (e.g., the two documents are the same, a little different, or a lot different), is the same as if the brute force method was used in the edit distance metric on the original documents. This is useful for such functions on mobile devices such as cell phones, where document size may impact the efficiency of the function.

There are also many well-known applications that use the "approximate nearest neighbor" search. Briefly, given a collection of n character strings, they are preprocessed to build a data structure that allows efficient implementation of repeated approximate search method as follows. A query string is provided, and then one (or several) of the n character string(s) from the original collection that are close in edit distance to the query string is/are returned.

The method of the present invention is useful for nearest neighbor searching because the original collection of character strings may be mapped to a corresponding collection of bit strings using the method of the present invention. A reverse mapping may be built specifying for each of the mapped bit strings the original character string that was mapped to it. Any known (or later-developed) nearest neighbor search scheme that works in the Hamming distance metric may now be used on the mapped query string and the mapped collection of strings to locate one or more bit strings from the original collection that is/are the nearest neighbor(s) to the query string. The reverse mapping could then be used to convert the answers back to the character string(s) in the original collection of character strings.

Thus, a plurality of input strings may be mapped to a corresponding plurality of output strings by using the method of the present invention. Then, the plurality of output strings may be related to each other in a manner to allow an approximate nearest neighbor search to be performed on them (see., e.g., the '640 patent). When a query input string is received, it is then mapped to a query output string by the method of the present invention. The approximate nearest neighbor search may then be performed on the query output string to select an approximate nearest neighbor (or neighbors) of the query output string from amongst the original mapped plurality of strings. If a reverse map was built/created relating each of the plurality of output strings to its corresponding input string, then the nearest neighbor(s) found may be easily converted back to the corresponding input string(s) using the reverse map.

Furthermore, the method can be useful simply by creating the plurality of shifted substrings of a first input string and a second input string, and then comparing the pluralities of shifted substrings to estimate the edit distance between the two substrings. So for two d-bit input strings, the method would include partitioning the first input string into several contiguous blocks of length L; then for each block for each whole number j from zero to n where n is the largest number such that $(\log d)^{n+1}$ is less than or equal to L, creating a plurality of shifted substrings by taking a sliding window of the block having length $L-(\log d)^j$. The same would be done for the second input string, creating a second plurality of shifted substrings. The edit distance between the two input strings could then be estimated by comparing the first plurality of shifted substrings to the second plurality of shifted substrings.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A method of embedding an edit distance metric into a Hamming distance metric, the method comprising:
   mapping a first electronic input string into a first electronic output string; and
   mapping a second electronic input string into a second electronic output string;
   wherein a Hamming distance between the first electronic output string and the second electronic output string is approximately proportional to an edit distance between the first electronic input string and the second electronic input string within a low distortion factor.

2. The method of claim 1 further comprising the step of creating a sketch of the first electronic output string and creating a sketch of the second electronic output string, and wherein the Hamming distance between the sketch of the first electronic output string and the sketch of the second electronic output string is approximately proportional to the Hamming distance between the first electronic output string and the second electronic output string within the distortion factor, such that the Hamming distance between the sketch of the first electronic output string and the sketch of the second electronic output string is approximately proportional to the edit distance between the first electronic input string and the second electronic input string within the distortion factor.

3. A method of embedding an edit distance metric into a Hamming distance metric, the method comprising:
   mapping a first electronic input string into a first electronic output string; and
   mapping a second electronic input string into a second electronic output string;
   wherein a Hamming distance between the first electronic output string and the second electronic output string is approximately proportional to an edit distance between the first electronic input string and the second electronic input string within a low distortion factor; and
   wherein the step of mapping the first electronic input string to the first electronic output string comprises partitioning the first electronic input string into several contiguous blocks of length L, defining a plurality of shifted substrings of the first electronic input string by taking a sliding window of one of the blocks, the sliding window having length $L-(\log d)^j$ for each whole number from zero to $(\log d)^j$, where j is the largest number such that $(\log d)^{j+1}$ is less than or equal to L.

4. The method of claim 3, wherein the step of mapping the second electronic input string to the second electronic output string comprises partitioning the second electronic input string into several contiguous blocks of length L, defining a plurality of shifted substrings of the second electronic input string by taking a second sliding window of one of the blocks of the second electronic input string, the second sliding window having length $L-(\log d)^j$ for each whole number from zero to $(\log d)^j$, where j is the largest number such that $(\log d)^{j+1}$ is less than or equal to L.

5. A method of embedding an edit distance metric into a Hamming distance metric, the method comprising:
   mapping a first electronic input string into a first electronic output string; and
   mapping a second electronic input string into a second electronic output string;
   wherein a Hamming distance between the first electronic output string and the second electronic output string is approximately proportional to an edit distance between the first electronic input string and the second electronic input string within a low distortion factor; and
   mapping a plurality of electronic input strings to a corresponding plurality of electronic output strings using a mapping algorithm such that a Hamming distance between a first selected one of the plurality of electronic output strings and a second selected one of the plurality of electronic output strings is approximately proportional to an edit distance between the electronic input strings corresponding to the first and second selected electronic output strings respectively, within the distortion factor;
   relating the plurality of electronic output strings to each other in a manner to allow an approximate nearest neighbor search to be performed on them;
   mapping an electronic query input string to an electronic query output string using the mapping algorithm on the electronic query input string; and
   performing an approximate nearest neighbor search on the electronic query output string to select an approximate nearest neighbor of the electronic query output string from amongst the plurality of electronic output strings.

6. The method of claim 5, further comprising building a reverse map relating each of the plurality of electronic output strings to its corresponding electronic input string, and converting the nearest neighbor back to its corresponding electronic input string using the reverse map.

* * * * *